(12) United States Patent
Bjorklund et al.

(10) Patent No.: US 7,359,612 B1
(45) Date of Patent: Apr. 15, 2008

(54) SPACE EFFICIENT NETWORK HARDWARE MOUNTING BRACKETS AND COMMUNICATIONS EQUIPMENT MOUNTING SYSTEMS INCORPORATING SAME

(75) Inventors: Brian Bjorklund, Lilburn, GA (US); Jack C. Martin, Jr., Cumming, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 11/784,039

(22) Filed: Apr. 5, 2007

Related U.S. Application Data

(60) Provisional application No. 60/883,675, filed on Jan. 5, 2007.

(51) Int. Cl.
*G02B 6/00* (2006.01)
(52) U.S. Cl. ................... 385/135; 385/134
(58) Field of Classification Search ........ 385/134, 385/135, 136, 138, 139, 147
See application file for complete search history.

(56) References Cited

U.S. PATENT DOCUMENTS

| | | | | |
|---|---|---|---|---|
| 4,353,469 A | * | 10/1982 | Etchison et al. | 211/41.17 |
| 5,740,300 A | * | 4/1998 | Hodge | 385/135 |
| 6,263,141 B1 | * | 7/2001 | Smith | 385/135 |
| 2002/0162808 A1 | * | 11/2002 | Jordan | 211/26 |
| 2004/0047116 A1 | * | 3/2004 | Dighde et al. | 361/683 |
| 2006/0267464 A1 | * | 11/2006 | Wyatt et al. | 312/265.4 |

* cited by examiner

*Primary Examiner*—Brian M Healy
(74) *Attorney, Agent, or Firm*—Myers Bigel Sibley & Sajovec, P.A.

(57) ABSTRACT

A communications equipment mounting system includes an equipment frame bay having first and second vertically oriented members in opposing spaced-apart relationship and a plurality of support shelves disposed within the equipment frame bay. Each support shelf is secured to the first and second members by respective first and second mounting brackets, and each support shelf is configured to support communications equipment thereon. The first bracket has a first width that is substantially less than a width of the second bracket. The second bracket is configured to support communications equipment attached thereto and thereby utilize otherwise unused space within the equipment frame bay.

20 Claims, 3 Drawing Sheets

US 7,359,612 B1

SPACE EFFICIENT NETWORK HARDWARE MOUNTING BRACKETS AND COMMUNICATIONS EQUIPMENT MOUNTING SYSTEMS INCORPORATING SAME

RELATED APPLICATION

This application claims the benefit of and priority to U.S. Provisional Patent Application No. 60/883,675, filed Jan. 5, 2007, the disclosure of which is incorporated herein by reference as if set forth in its entirety.

FIELD OF THE INVENTION

The present invention relates generally to communications networks and, more particularly, to communications network hardware and mounting of same.

BACKGROUND OF THE INVENTION

Fiber termination panels or fiber termination shelves provide termination and service access points for fiber optic circuits having large numbers of optic fibers. Fiber termination panel frames are conventionally installed in bay increments having standard widths. Fiber termination panels, which are configured to support optic fiber termination modules and other hardware, are secured within equipment frame bays via support brackets. Optic fiber termination modules supported on fiber termination panels are the cross connect point between a fiber optic cable and the equipment in a network that is optically fed. Fiber jumpers are used to connect optic fiber termination modules on the fiber termination panels to network equipment.

FIG. 1 illustrates a conventional fiber termination panel 1 and mounting bracket 2 for securing the shelf 1 to a frame. As would be understood by one skilled in the art, another identical bracket would be located on the other side of the shelf 1. In other words, a pair of brackets 2 are conventionally utilized to secure the shelf 1 to a frame. A fiber termination panel 1 is conventionally centered within a equipment frame bay because the dimensions of the mounting brackets 2 are identical.

Conventionally, equipment frame bays that support fiber termination panels have standard widths of nineteen inches (19") and twenty-three inches (23"), while fiber termination panels conventionally have a standard width of seventeen inches (17"). To install a fiber termination panel within a 23" wide equipment frame bay, longer mounting brackets are used. Unfortunately, this reduces the amount of space available for supporting other equipment within an equipment frame bay. Moreover, the use of a 17" LGX shelf within a 23" equipment frame bay may require additional fiber termination panels to support other equipment. Because rack space in Central Offices (COs), cabinets, and customer premise locations is often limited, a need for more efficient mounting solutions exists.

SUMMARY OF THE INVENTION

According to some embodiments of the present invention, a communications equipment mounting system includes an equipment frame bay having first and second vertically oriented members in opposing spaced-apart relationship and a plurality of support shelves disposed within the equipment frame bay. Each support shelf is secured to the first and second members by respective first and second mounting brackets, and each support shelf is configured to support communications equipment thereon. The first bracket has a first width that is substantially less than a width of the second bracket (i.e., the second bracket is substantially wider than the first bracket). The second bracket is configured to support communications equipment attached thereto and thereby utilize otherwise unused space within the equipment frame bay.

According to some embodiments of the present invention, the second bracket has a wall with an access opening and a plurality of apertures adjacent a periphery of the access opening. Communications equipment is secured to the wall via fasteners inserted through the plurality of apertures and such that the communications equipment is accessible via the access opening.

According to some embodiments of the present invention, the first and second brackets each have an L-shaped configuration with respective front and side walls that are substantially orthogonal to each other. The width of the second bracket front wall is substantially greater than the width of the first bracket front wall. The second bracket front wall also includes an access opening and a plurality of apertures adjacent a periphery of the access opening. Communications equipment is secured to the second bracket front wall via fasteners inserted through the plurality of apertures and such that the communications equipment is accessible via the access opening.

According to some embodiments of the present invention, an optical fiber administration system includes an equipment frame bay having first and second vertically oriented members in opposing spaced-apart relationship, and a fiber termination panel disposed within the equipment frame bay. The fiber termination panel is secured to the first and second members by respective first and second mounting brackets and is configured to support a fiber optic termination module. The first bracket has a width that is substantially less than the width of the second bracket, and a fiber optic module (e.g., a Wave Division Multiplexing (WDM) module, Coarse Wave Division Multiplexing (CWDM) module, or Dense Wave Division Multiplexing (DWDM) module) is secured directly to the second bracket. The term "xWDM" can be used to represent any of the family of WDM, CWDM, and DWDM type modules.

According to some embodiments of the present invention, an optical fiber administration system includes an equipment frame bay having first and second vertically oriented members in opposing spaced-apart relationship, and a fiber termination panel disposed within the equipment frame bay and secured to the first and second members by respective first and second mounting brackets. A fiber optic termination module is supported by the fiber termination panel. The first and second brackets each have an L-shaped configuration that define respective front and side walls that are substantially orthogonal to each other. The width of the second bracket front wall is substantially greater than the width of the first bracket front wall. The second bracket front wall has an access opening and a plurality of apertures adjacent a periphery of the access opening. A Wave Division Multiplexing (xWDM) module is secured to the second bracket front wall via fasteners inserted through the plurality of apertures and such that the xWDM module is accessible via the access opening.

Other mounting brackets and systems incorporating same, according to embodiments of the invention, will be or become apparent to one with skill in the art upon review of the following drawings and detailed description. It is intended that all such additional mounting brackets and systems incorporating same be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

Figure 1:
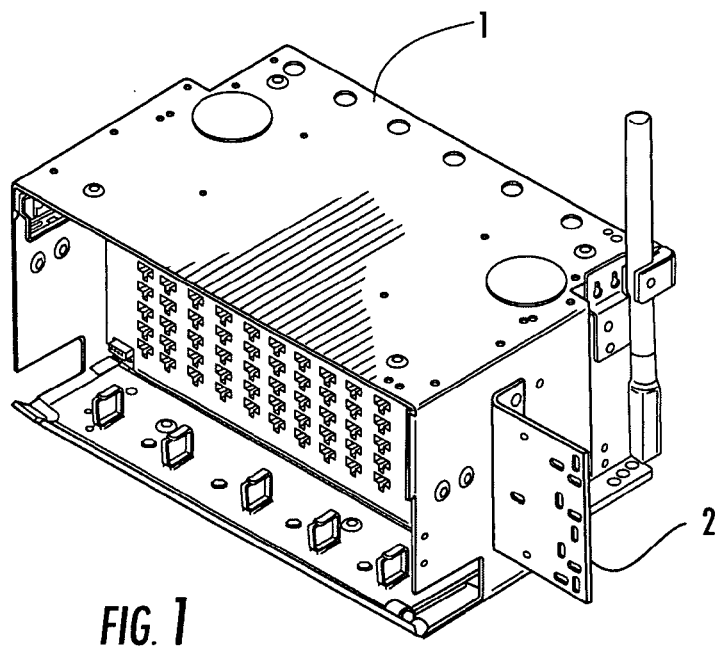
FIG. 1 illustrates a conventional fiber termination panel and mounting bracket for supporting the fiber termination panel within an equipment frame bay.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
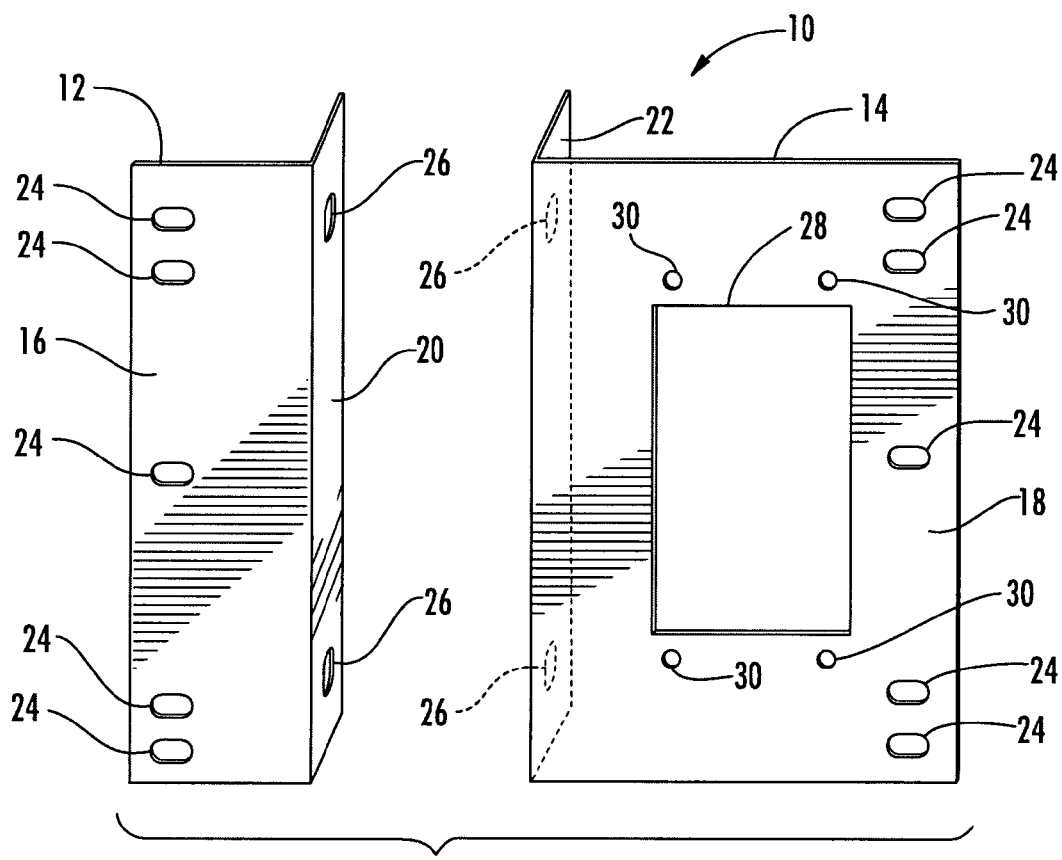
FIG. 2 is a front perspective view of a pair of fiber termination panel mounting brackets, according to some embodiments of the present invention.

FIG. 2 illustrates a pair 10 of shelf mounting brackets 12, 14 (e.g., LGX shelf mounting brackets, etc.) according to some embodiments of the present invention. Each illustrated bracket 12, 14 has a generally "L-shaped" configuration with a respective front wall 16, 18 and a respective side wall 20, 22. The pair 10 of brackets 12, 14 are configured to be attached to respective sides of a fiber termination panel (or other type) shelf (e.g., 1, FIG. 1) and to facilitate attachment of the shelf within an equipment frame bay, as would be understood by one skilled in the art.

The illustrated front wall 16, 18 of each respective bracket 12, 14 is rectangular in shape. According to one embodiment of the present invention, the front wall 18 of bracket 14 has, for example, a width of about five inches (5") and a length of about seven inches (7"), and the front wall 16 of bracket 12 has a width of about two inches (2") and a length of about seven inches (7"). However, embodiments of the present invention are not limited to these front wall dimensions. Brackets 12, 14, may have various front wall dimensions, without limitation. Moreover, the front walls 16, 18 of brackets 12, 14 may have various shapes without limitation and need not be rectangular in shape.

The illustrated side wall 20, 22 of each respective bracket 12, 14 is rectangular in shape and has, for example, a width of about one inch (1") and a length of about seven inches (7"). However, embodiments of the present invention are not limited to these side wall dimensions. Brackets 12, 14, may have various side wall dimensions, without limitation. Moreover, the side walls 20, 22 of brackets 12, 14 may have various shapes without limitation and need not be rectangular in shape.

The front wall 16, 18 of each respective bracket 12, 14 includes a plurality of spaced apart apertures 24 for securing the respective bracket 12, 14 to an equipment frame bay (not shown). Bolts, screws, or other known fasteners are inserted through apertures 24 and secured to an equipment frame bay, as would be understood by those skilled in the art. The side wall 20, 22 of each respective bracket 12, 14 includes a plurality of spaced apart apertures 26 for securing the respective bracket 12, 14 to a fiber termination panel (e.g., 1, FIG. 1). Bolts, screws, or other known fasteners are inserted through apertures 26 and secured to a shelf, as would be understood by those skilled in the art.

Figure 3:
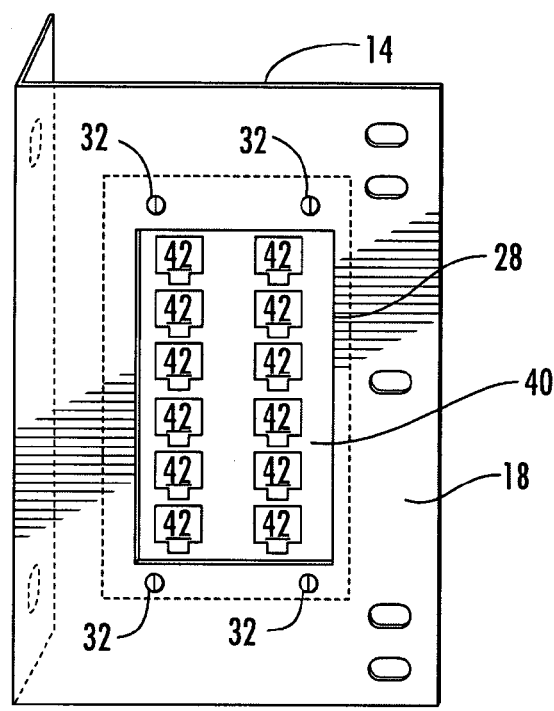
FIG. 3 is a front view of one of the mounting brackets of FIG. 2 illustrating a hardware module attached thereto, according to some embodiments of the present invention.

The illustrated front wall 18 of bracket 14 includes an opening 28 with a plurality of apertures 30 adjacent the periphery thereof. Various network hardware is configured to be mounted to the front wall 18 of bracket 14 so as to be accessible through opening 28. According to some embodiments of the present invention, hardware could be received through the opening 28, i.e., the hardware, or a portion thereof, could extend through the opening 28. Hardware may be mounted to either or both of the front and rear portions of the front wall 18 of bracket 14. Hardware is configured to be secured to the bracket front wall 18 via bolts, screws, or other known fasteners inserted through apertures 30 and secured to the bracket front wall 18, as would be understood by those skilled in the art. For example, a Coarse Wave Division Multiplexing (CWDM) module 40 may be mounted to the bracket front wall 18 via fasteners 32 as illustrated in FIG. 3. CWDM modules are utilized to split or combine eight wavelengths or more in a single optical fiber. The illustrated CWDM module 40 in FIG. 3 includes a plurality of ports 42 (e.g., optical fiber ports, etc.) accessible through opening 28.

The illustrated front wall opening 28 is rectangular in shape. However, opening 28 may have various shapes to accommodate and/or provide access to various hardware mounted to bracket 14, without limitation.

According to some embodiments of the present invention, the front wall 16 of bracket 12 may also include an opening with a plurality of adjacent apertures around the periphery thereof for the purpose of securing various network hardware thereto. According to some embodiments of the present invention, the illustrated configurations of brackets 12, 14 may be reversed. In other words, bracket 12 may be configured to support network hardware that is accessible and/or received through an opening as described above with respect to bracket 14.

Each bracket 12, 14 may be formed from various materials including, but not limited to, metal, polymeric materials, ceramics, etc., or various combinations thereof.

When the illustrated bracket 14 is utilized to support a 17" fiber termination panel in a 23" equipment frame bay, the need for an additional shelf for supporting other equipment, such as jumper management hardware (e.g., an xWDM module, etc.) can be eliminated. As such, embodiments of the present invention help maximize the use of limited space within optical fiber closets, cabinets, frames, etc.

Embodiments of the present invention are not limited to brackets for use with LGX shelves and frames. Brackets according to embodiments of the present invention may be utilized in mounting any type of shelf/support within a cabinet, frame, etc.

Figure 4:
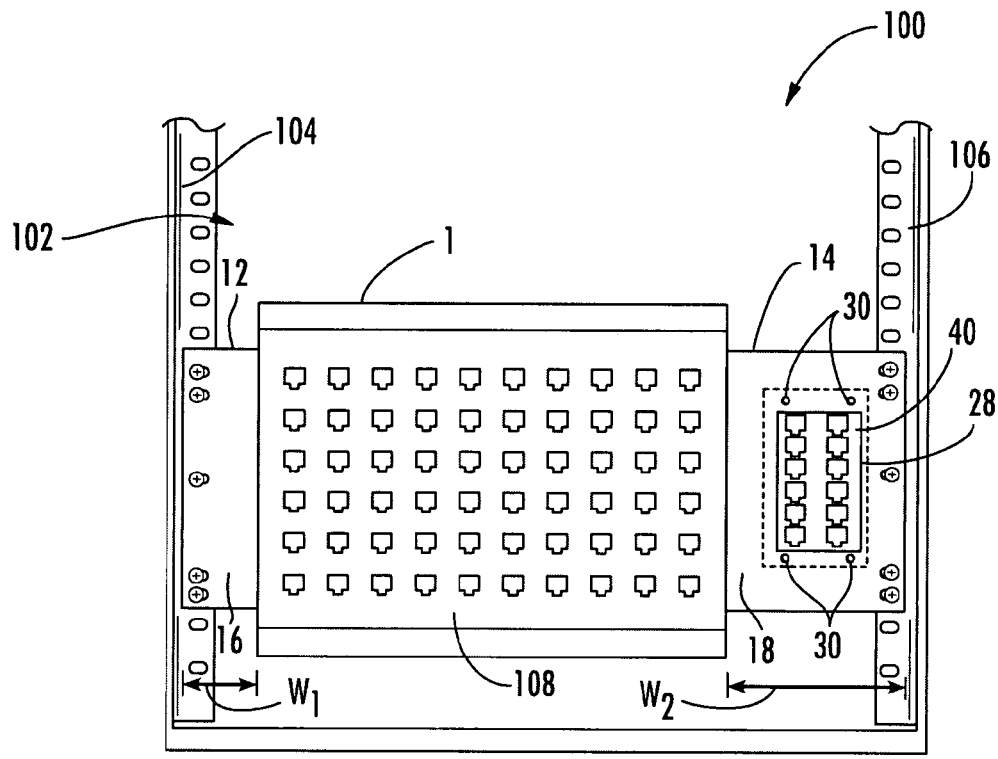
FIG. 4 is a front plan view of a communications equipment mounting system utilizing the mounting brackets of FIG. 2, according to some embodiments of the present invention.

Referring now to FIG. 4, an optical fiber administration system 100, according to some embodiments of the present invention, is illustrated. The illustrated optical fiber administration system 100 includes an equipment frame bay 102 having first and second vertically oriented members 104, 106 in opposing spaced-apart relationship. The equipment frame bay 102 may include other structural elements that are not illustrated, and is not limited to the illustrated embodiment. The equipment frame bay 102 is configured to support a plurality of vertically stacked shelves, such as fiber termination panels.

In the illustrated embodiment, a fiber termination panel 1 is disposed within the equipment frame bay 102, and is secured to the first and second members 104, 106 by respective first and second mounting brackets 12, 14. Although illustrated in front plan view, the first and second brackets 12, 14 each have an L-shaped configuration that defines respective front and side walls as illustrated in FIG. 2. For example, the first bracket 12 includes a front wall 16 and side wall 20 that are substantially orthogonal to each other, and the second bracket 14 includes a front wall 18 and side wall 22 that are substantially orthogonal to each other. The width $W_1$ of the first bracket front wall 16 is substantially less than the width $W_2$ of the second bracket front wall 18.

The second bracket front wall 18 includes an access opening 28 and a plurality of apertures 30 adjacent a periphery of the access opening 28. A fiber optic termination module 108 is supported by the fiber termination panel 1, and a fiber optic module 40, such as an xWDM module, etc., is secured to the second bracket front wall 18 via fasteners inserted through the plurality of apertures 30 and such that the optic fiber module 40 is accessible via the access opening 28.

According to some embodiments of the present invention, a fiber optic module 40 (or other equipment secured to the second bracket 14) may have a portion that extends through the access opening 28.

Figure 5:
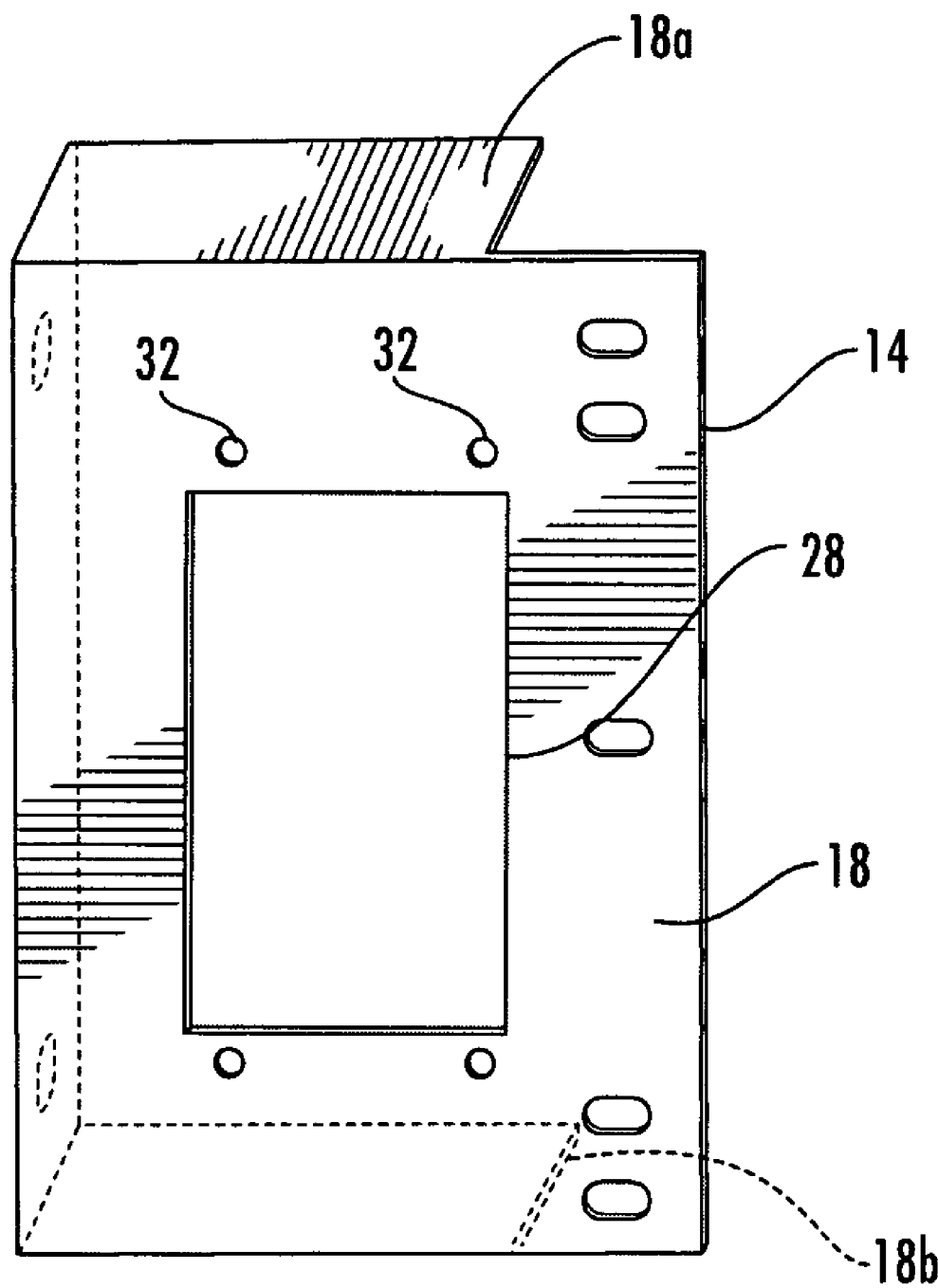
FIG. 5 is a front view of one of the mounting brackets of FIG. 2 illustrating stiffening members, according to some embodiments of the present invention.

According to some embodiments of the present invention, one or both of the first and second brackets 12, 14 may include one or more stiffening members. For example, as illustrated in FIG. 5, a portion of the bracket 14 at the top and/or bottom of the front wall 18 (i.e., elements 18a, 18b) may be bent rearwardly to serve the function of stiffening members. Various other types of stiffening members may be utilized in accordance with embodiments of the brackets 12, 14, without limitation. For example, stiffening members may be molded in with the brackets 12, 14, and/or may be formed within the brackets 12, 14. Different gauge material may also be utilized to add stiffness. Any known method of stiffening the mounting brackets 12, 14 may be utilized, without limitation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A communications equipment mounting system, comprising:
    an equipment frame bay comprising first and second vertically oriented members in opposing spaced-apart relationship; and
    a plurality of support shelves disposed within the equipment frame bay, wherein each support shelf is secured to the first and second members by respective first and second mounting brackets, wherein each support shelf is configured to support communications equipment thereon;
    wherein the first bracket has a first width, and wherein the second bracket has a second width substantially greater than the first width and is configured to support communications equipment attached thereto.

2. The communications equipment mounting system of claim 1, wherein the second bracket comprises a wall having an access opening and a plurality of apertures adjacent a periphery of the access opening, wherein communications equipment can be secured to the wall via fasteners inserted through the plurality of apertures and such that the communications equipment is accessible via the access opening.

3. The communications equipment mounting system of claim 1, wherein the second bracket has an L-shaped configuration defining front and side walls that are substantially orthogonal to each other, wherein the front wall comprises an access opening and a plurality of apertures adjacent a periphery of the access opening, wherein communications equipment can be secured to the front wall via fasteners inserted through the plurality of apertures and such that the communications equipment is accessible via the access opening.

4. The communications equipment mounting system of claim 2, wherein the access opening is substantially rectangular.

5. The communications equipment mounting system of claim 2, wherein the access opening receives a portion of the communications equipment therethrough.

6. The communications equipment mounting system of claim 1, wherein the second bracket comprises one or more stiffening members.

7. The communications equipment mounting system of claim 1, wherein the first and second mounting brackets comprise material selected from the group consisting of metals, polymeric materials, ceramics, and combinations thereof.

8. The communications equipment mounting system of claim 1, wherein each support shelf is configured to support one or more optic fiber termination modules thereon, and wherein each second bracket is configured to support a Wave Division Multiplexing (WDM) module, Coarse Wave Division Multiplexing (CWDM) module, Dense Wave Division Multiplexing (DWDM) module, or additional optic fiber termination module attached thereto.

9. An optical fiber administration system, comprising:
   an equipment frame bay comprising first and second vertically oriented members in opposing spaced-apart relationship;
   a fiber termination panel disposed within the equipment frame bay, wherein the fiber termination panel is secured to the first and second members by respective first and second mounting brackets and is configured to support a fiber optic termination module, wherein the first bracket has a first width, and wherein the second bracket has a second width substantially greater than the first width; and
   a fiber optic module secured directly to the second bracket.

10. The optical fiber administration system of claim 9, wherein the second bracket comprises a wall having an access opening and a plurality of apertures adjacent a periphery of the access opening, wherein the optic fiber module is secured to the wall via fasteners inserted through the plurality of apertures and such that the optic fiber module is accessible via the access opening.

11. The optical fiber administration system of claim 9, wherein the second bracket has an L-shaped configuration defining front and side walls that are substantially orthogonal to each other, wherein the front wall comprises an access opening and a plurality of apertures adjacent a periphery of the access opening, wherein the optic fiber module is secured to the front wall via fasteners inserted through the plurality of apertures and such that the optic fiber module is accessible via the access opening.

12. The optical fiber administration system of claim 10, wherein the access opening is substantially rectangular.

13. The optical fiber administration system of claim 10, wherein a portion of the optic fiber module extends through the access opening.

14. The optical fiber administration system of claim 9, wherein the second bracket comprises one or more stiffening members.

15. The optical fiber administration system of claim 9, wherein the first and second mounting brackets comprise material selected from the group consisting of metals, polymeric materials, ceramics, and combinations thereof.

16. The optical fiber administration system of claim 9, wherein the optic fiber module secured to the second bracket is a Wave Division Multiplexing (WDM) module, Coarse Wave Division Multiplexing (CWDM) module, Dense Wave Division Multiplexing (DWDM) module, or additional optic fiber termination module.

17. An optical fiber administration system, comprising:
   an equipment frame bay comprising first and second vertically oriented members in opposing spaced-apart relationship;
   a fiber termination panel disposed within the equipment frame bay, wherein the fiber termination panel is secured to the first and second members by respective first and second mounting brackets, wherein the first and second brackets each have an L-shaped configuration defining respective front and side walls that are substantially orthogonal to each other, wherein a width of the second bracket front wall is substantially greater than a width of the first bracket front wall, and wherein the second bracket front wall comprises an access opening and a plurality of apertures adjacent a periphery of the access opening;
   a fiber optic termination module supported by the fiber termination panel; and
   a Wave Division Multiplexing (xWDM) module secured to the second bracket front wall via fasteners inserted through the plurality of apertures and such that the CWDM module is accessible via the access opening.

18. The optical fiber administration system of claim 17, wherein a portion of the xWDM module extends through the access opening.

19. The optical fiber administration system of claim 17, wherein the second bracket comprises one or more stiffening members.

20. The optical fiber administration system of claim 17, wherein the first and second mounting brackets comprise material selected from the group consisting of metals, polymeric materials, ceramics, and combinations thereof.

\* \* \* \* \*